United States Patent
Yue et al.

(10) Patent No.: US 11,161,507 B2
(45) Date of Patent: Nov. 2, 2021

(54) METHOD AND APPARATUS FOR CONTROLLING VEHICLE TRAVELLING, AND VEHICLE

(71) Applicant: GREAT WALL MOTOR COMPANY LIMITED, Baoding (CN)

(72) Inventors: Zhiyang Yue, Baoding (CN); Lin He, Baoding (CN); Tianpei Wang, Baoding (CN); Jianyong Ge, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 156 days.

(21) Appl. No.: 16/499,860

(22) PCT Filed: Mar. 29, 2018

(86) PCT No.: PCT/CN2018/081074
§ 371 (c)(1),
(2) Date: Sep. 30, 2019

(87) PCT Pub. No.: WO2018/177367
PCT Pub. Date: Oct. 4, 2018

(65) Prior Publication Data
US 2020/0108828 A1    Apr. 9, 2020

(30) Foreign Application Priority Data
Mar. 30, 2017   (CN) .......................... 201710204104.8

(51) Int. Cl.
*B60W 30/12* (2020.01)
*B60W 30/045* (2012.01)
*B62D 6/00* (2006.01)

(52) U.S. Cl.
CPC .......... *B60W 30/12* (2013.01); *B60W 30/045* (2013.01); *B62D 6/00* (2013.01);
(Continued)

(58) Field of Classification Search
CPC .............. B60W 30/12; B60W 30/045; B60W 2520/06; B60W 2520/10; B60W 2710/20; B62D 6/00
See application file for complete search history.

(56) References Cited

U.S. PATENT DOCUMENTS

2002/0035425 A1\* 3/2002 Deguchi ................ B62D 7/159
701/41
2005/0177308 A1  8/2005 Tange et al.
(Continued)

FOREIGN PATENT DOCUMENTS

CN  1532101 A   9/2004
CN  102765385 A  11/2012
(Continued)

*Primary Examiner* — Jeff A Burke
*Assistant Examiner* — Jamal A Shah
(74) *Attorney, Agent, or Firm* — Bayramoglu Law Offices LLC

(57) ABSTRACT

A method for controlling vehicle travelling includes: detecting a plurality of travelling states of a vehicle, the plurality of travelling states includes a plurality of travelling directions; respectively previewing the vehicle travelling along the plurality of travelling directions from an original position in a lane to obtain a plurality of previewing paths; fitting a plurality of turning paths of the vehicle travelling from the original position to a target path in the lane according to the plurality of previewing paths; using the plurality of turning paths to calculate change information of a plurality of steering wheel angles; and adjusting the plurality of travelling directions according to the change information of the steering wheel angles, so as to control the vehicle to travel from the original position to the target path along the turning path.

15 Claims, 4 Drawing Sheets

(52) U.S. Cl.
CPC ..... *B60W 2520/06* (2013.01); *B60W 2520/10* (2013.01); *B60W 2710/20* (2013.01)

(56) References Cited

U.S. PATENT DOCUMENTS

2013/0317698 A1* 11/2013 Yoon .................... B62D 15/025
                                                    701/41
2017/0154529 A1*  6/2017 Zhao .................... B60W 30/12

FOREIGN PATENT DOCUMENTS

| | | |
|---|---|---|
| CN | 103204163 A | 7/2013 |
| CN | 105774801 A | 7/2016 |
| CN | 106114507 A | 11/2016 |
| JP | 2013086781 A | 5/2013 |
| JP | 2014151758 A | 8/2014 |

* cited by examiner

METHOD AND APPARATUS FOR CONTROLLING VEHICLE TRAVELLING, AND VEHICLE

CROSS REFERENCE TO THE RELATED APPLICATIONS

This application is the national phase entry of International Application No. PCT/CN2018/081074, filed on Mar. 29, 2018, which is based upon and claims priority to Chinese Patent Application No. 201710204104.8, filed on Mar. 30, 2017, the entire contents of which are incorporated herein by reference.

TECHNICAL FIELD

The disclosure relates to the field of vehicle technologies, and more particularly, to a method and an apparatus for controlling vehicle travelling, and a vehicle.

BACKGROUND

With the development of science and technology, traffic safety issues are becoming more and more prominent. Vehicle safety is refined and may be divided into active safety and passive safety.

In an active safety technology, if a center position of a vehicle exceeds a center line of a lane to a large extent when the vehicle is travelling, a certain torque is applied to a steering wheel by PID (Proportion Integration Differentiation) adjustment, so as to steer the vehicle back to the center line of the lane.

Parameters of the proportion, integration and differentiation links in the PID adjustment are generally set according to experience, which have the disadvantage of low accuracy. Moreover, values of the parameters are often too large, resulting in overshoot, shock and other problems, and the comfort of drivers is low.

SUMMARY

In the view of the above problems, in order to solve the above problems of overshoot and shock easily caused by controlling the vehicle to return to the center position of the lane by PID adjustment, the embodiment of the invention provides a method and an apparatus for controlling vehicle travelling, and a vehicle.

According to an aspect of the disclosure, there is provided a method for controlling vehicle travelling, including:

detecting a plurality of travelling states of a vehicle, the plurality of travelling states including a plurality of travelling directions;

respectively previewing the vehicle travelling along the plurality of travelling directions from an original position in a lane to obtain a plurality of previewing paths;

fitting a plurality of turning paths of the vehicle travelling from the original position to a target path in the lane according to the plurality of previewing paths;

using the plurality of turning paths to calculate change information of a steering wheel angle; and adjusting the travelling direction according to the change information of the steering wheel angle, so as to control the vehicle to travel from the original position to the target path along the turning path.

Preferably, the travelling state further includes a travelling speed; and the step of respectively previewing the vehicle travelling along the plurality of travelling directions from the original position in the lane to obtain the plurality of previewing paths includes:

predicting a path of the vehicle obtained by travelling along the travelling direction for a period of time from the original position at the travelling speed as the previewing path.

Preferably, the step of fitting the turning paths of the vehicle travelling from the original position to the target path in the lane according to the plurality of previewing paths includes:

selecting a target position deviating from the previewing path from the target path of the lane; and fitting the turning path of the vehicle travelling from the original position to the target position.

Preferably, the step of selecting the target position deviating from the previewing path from the target path of the lane includes:

selecting a previewing position in the previewing path; and selecting a position satisfying a preset deviation condition from the target path of the lane as the target position deviating from the previewing path;

wherein the deviation condition is: forming a previewing deviation with a path between the previewing positions, the previewing deviation being perpendicular to the previewing path.

Preferably, the step of fitting the turning paths of the vehicle travelling from the original position to the target position includes:

setting a steering center in a direction perpendicular to the travelling direction; and fitting the turning path of the vehicle travelling from the original position to the target position on the basis of the steering center.

Preferably, the step of using the plurality of turning paths to calculate the change information of the steering wheel angle includes:

calculating a plurality of turning radii of the plurality of turning paths;

using the plurality of turning radii to calculate a plurality of steering wheel angles; and using the plurality of steering wheel angles to calculate the change information.

Preferably, the travelling state further includes a first distance and a second distance, the first distance is a distance between a left wheel of the vehicle and a left lane line of the lane, and the second distance is a distance between a right wheel of the vehicle and a right lane line of the lane; and the step of calculating the plurality of turning radii of the plurality of turning paths includes:

using a difference value between the first distance and the second distance to calculate a travelling deviation of the vehicle deviating from the target path;

using the travelling direction, the previewing path and the travelling deviation to calculate a previewing deviation of the target position deviating from the previewing path;

using the previewing deviation to calculate a target distance between the original position and the target position; and using the target distance to calculate the turning radius of the turning path.

According to another aspect of the disclosure, there is provided an apparatus for controlling vehicle travelling, including:

a travelling state detecting module configured to detect a plurality of travelling states of a vehicle, the plurality of travelling states including a plurality of travelling directions:

a travelling previewing module configured to respectively preview the vehicle travelling along the travelling directions from an original position in a lane to obtain a plurality of previewing paths;

a turning path fitting module configured to fit a plurality of turning paths of the vehicle travelling from the original position to a target path in the lane according to the plurality of previewing paths;

a steering wheel angle calculating module configured to use the plurality of turning paths to calculate change information of a steering wheel angle; and a travelling direction adjusting module configured to adjust the travelling direction according to the change information of the steering wheel angle, so as to control the vehicle to travel from the original position to the target path along the turning path.

Preferably, the travelling state further includes a travelling speed; and the travelling previewing module includes:

a travelling section predicting submodule configured to predict a path of the vehicle obtained by travelling along the travelling direction for a period of time from the original position of the lane at the travelling speed as the previewing path.

Preferably, the turning path fitting module includes:

a target position selecting submodule configured to select a target position deviating from the previewing path from the target path of the line; and a target position fitting module configured to fit the turning path of the vehicle travelling from the original position to the target position.

Preferably, the target position selecting submodule includes:

a previewing position selecting module configured to select a previewing position in the previewing path; and a deviation position selecting module configured to select a position satisfying a preset deviation condition from the target path of the lane as the target position deviating from the previewing path;

wherein the deviation condition is: forming a previewing deviation with a path between the previewing positions, the previewing deviation being perpendicular to the previewing path.

Preferably, the target position fitting module includes:

a steering center setting module configured to set a steering center in a direction perpendicular to the travelling direction; and a steering center fitting module configured to fit the turning path of the vehicle travelling from the original position to the target position on the basis of the steering center.

Preferably, the steering wheel angle calculating module includes:

a radius calculating module configured to calculate a plurality of turning radii of the plurality of turning paths;

a steering wheel angle calculating module configured to use the plurality of turning radii to calculate a plurality of steering wheel angles; and a change information calculating module configured to use the plurality of steering wheel angles to calculate the change information.

Preferably, the travelling state further includes a first distance and a second distance, the first distance is a distance between a left wheel of the vehicle and a left lane line of the lane, and the second distance is a distance between a right wheel of the vehicle and a right lane line of the lane; and the radius calculating module includes:

a travelling deviation calculating module configured to use a difference value between the first distance and the second distance to calculate a travelling deviation of the vehicle deviating from the target path;

a previewing deviation calculating module configured to use the travelling direction, the previewing path and the travelling deviation to calculate a previewing deviation of the target position deviating from the previewing path;

a target distance calculating module configured to use the previewing deviation to calculate a target distance between the original position and the target position; and a turning radius calculating module configured to use the target distance to calculate the turning radius of the turning path.

According to another aspect of the disclosure, there is provided a vehicle, including:

a sensor configured to detect a plurality of travelling states of a vehicle, the plurality of travelling states including a plurality of travelling directions;

a controller configured to respectively preview the vehicle travelling along the plurality of travelling directions from an original position in a lane to obtain a plurality of previewing paths; fit a plurality of turning paths of the vehicle travelling from the original position in the lane to a target path in the lane according to the plurality of previewing paths; and use the plurality of turning paths to calculate change information of a steering wheel angle; and an electric steering system configured to adjust the travelling direction according to the change information of the steering wheel angle, so as to control the vehicle to travel from the original position to the target position along the turning path.

Preferably, the sensor includes one of the followings:

a speed sensor configured to detect a travelling speed of the vehicle as a travelling state; and a camera configured to detect a travelling direction of the vehicle, a first distance and a second distance as travelling states.

The first distance is a distance between a left wheel of the vehicle and a left lane line of the lane, and the second distance is a distance between a right wheel of the vehicle and a right lane line of the lane.

Preferably, the travelling state further includes a travelling speed; and the controller is also configured to:

predict a path of the vehicle obtained by travelling along the travelling direction for a period of time from the original position of the lane at the travelling speed as the previewing path.

Preferably, the controller is also configured to:

select a target position deviating from the previewing path from the target path of the lane; and fit the turning path of the vehicle travelling from the original position to the target position.

Preferably, the controller is also configured to:

select a previewing position in the previewing path; and select a position satisfying a preset deviation condition from the target path of the lane as the target position deviating from the previewing path;

wherein the deviation condition is: forming a previewing deviation with a path between the previewing positions, the previewing deviation being perpendicular to the previewing path.

Preferably, the controller is also configured to:

set a steering center in a direction perpendicular to the travelling direction; and fit the turning path of the vehicle travelling from the original position to the target position on the basis of the steering center.

Preferably, the controller is also configured to:

calculate a plurality of turning radii of the plurality of turning paths;

use the plurality of turning radii to calculate a plurality of steering wheel angles; and use the plurality of steering wheel angles to calculate the change information.

Preferably, the travelling state further includes a first distance and a second distance, the first distance is a distance between a left wheel of the vehicle and a left lane line of the lane, and the second distance is a distance between a right wheel of the vehicle and a right lane line of the lane; and the controller is also configured to:

use a difference value between the first distance and the second distance to calculate a travelling deviation of the vehicle deviating from the target path;

use the travelling direction, the previewing path and the travelling deviation to calculate a previewing deviation of the target position deviating from the previewing path;

use the previewing deviation to calculate a target distance between the original position and the target position; and use the target distance to calculate the turning radius of the turning path.

According to yet another aspect of the disclosure, there is provided a computer readable medium storing a computer program for executing the above method for controlling vehicle travelling.

The embodiments of the disclosure include the following advantages.

By predicating the motion state of the vehicle, previewing the previewing path for future travelling, performing deviation according to the previewing path, fitting the turning path of the vehicle from the original position to the target path, taking a future previewing path as a target to adjust the current steering wheel angle, the embodiments of the disclosure can implement advanced adjustment, so that the vehicle can return to the target path of the lane, and adjustment according to the empirical value is avoided; moreover, the turning path obtained based on deviation of the previewing path is larger, so that a centripetal force during turning is reduced, and the possibility of slipping is reduced, which ensures the stability of travelling while maintaining a certain travelling speed, effectively alleviates the problems of overshoot and shock, and improves the comfort of drivers.

DETAILED DESCRIPTION OF THE EMBODIMENTS

In order to more apparently understand the above objects, features and advantages of the disclosure, the disclosure will be described in further detail hereinafter with reference to the drawings and detailed description.

Figure 1:
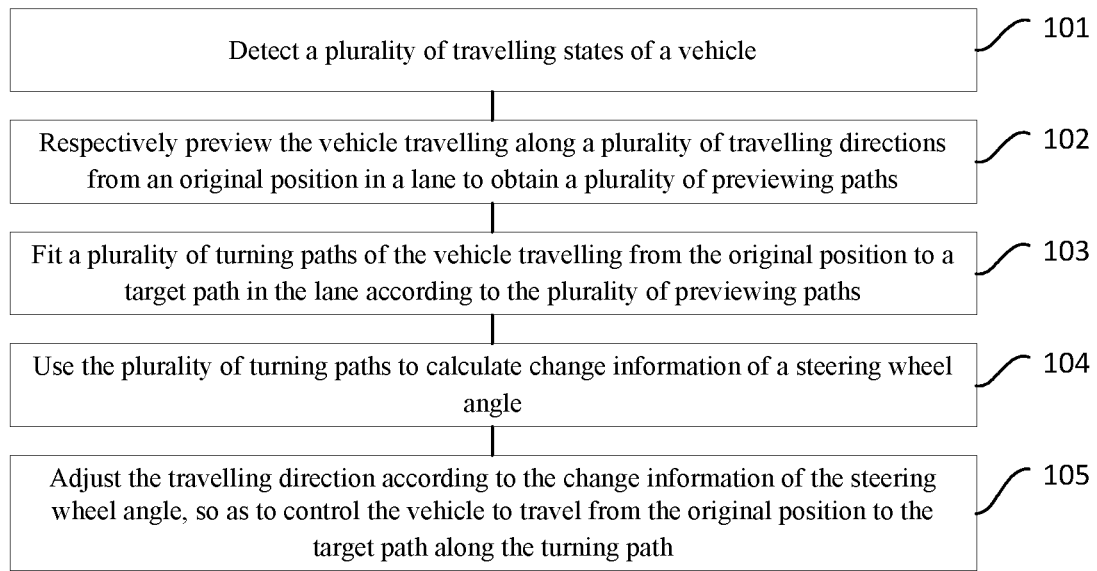
FIG. 1 is a flow chart of steps of a method for controlling vehicle travelling according to one embodiment of the disclosure.

FIG. 1 illustrates a flow chart of steps of a method for controlling vehicle travelling according to one embodiment of the disclosure, which may specifically include the following steps.

In step 101, a plurality of travelling states of a vehicle are detected.

In practical applications, a variety of sensors are integrated into the vehicle, such as speed sensors, acceleration sensors, angular velocity sensors, cameras, etc. By calling these sensors, a travelling state of the vehicle may be detected.

In one example, a speed sensor may detect a travelling speed of the vehicle as a travelling state.

In another example, a camera may detect a travelling direction of the vehicle, a first distance and a second distance as travelling states.

The first distance is a distance between a left wheel of the vehicle and a left lane line of the lane, and the second distance is a distance between a right wheel of the vehicle and a right lane line of the lane.

Of course, the above sensors and the travelling states detected thereby are only examples. When implementing the embodiment of the disclosure, other sensors and travelling states detected thereby may be set according to the actual situation, and the embodiment of the disclosure is not limited thereto. In addition, in addition to the above sensors and the travelling states detected thereby, other sensors and travelling states detected thereby may be adopted by those skilled in the art according to actual needs, and the embodiment of the disclosure is not limited thereto.

In the embodiment of the disclosure, a target path is set in the lane, for example, the center line of the lane, and if the vehicle travels along the target path, the safety of travelling can be improved.

Of course, in addition to the center line of the lane, other paths may also be set as target paths, for example, paths within a certain range (e.g., 20 cm) of the center line of the lane, etc., and the embodiment of the disclosure is not limited thereto.

The vehicle travels on the lane. At a certain moment, the vehicle travels to an original position in the lane, which is often located outside the target path. At this time, the original position has deviated from the target path, and it is necessary to control the vehicle to travel back to the target path.

It should be noted that the original position where the vehicle is located may refer to a position of a center point of the vehicle, and may also refer to positions of other parts of the vehicle, such as a position on a headstock of the vehicle, etc. The embodiment of the disclosure is not limited thereto.

Figure 2:
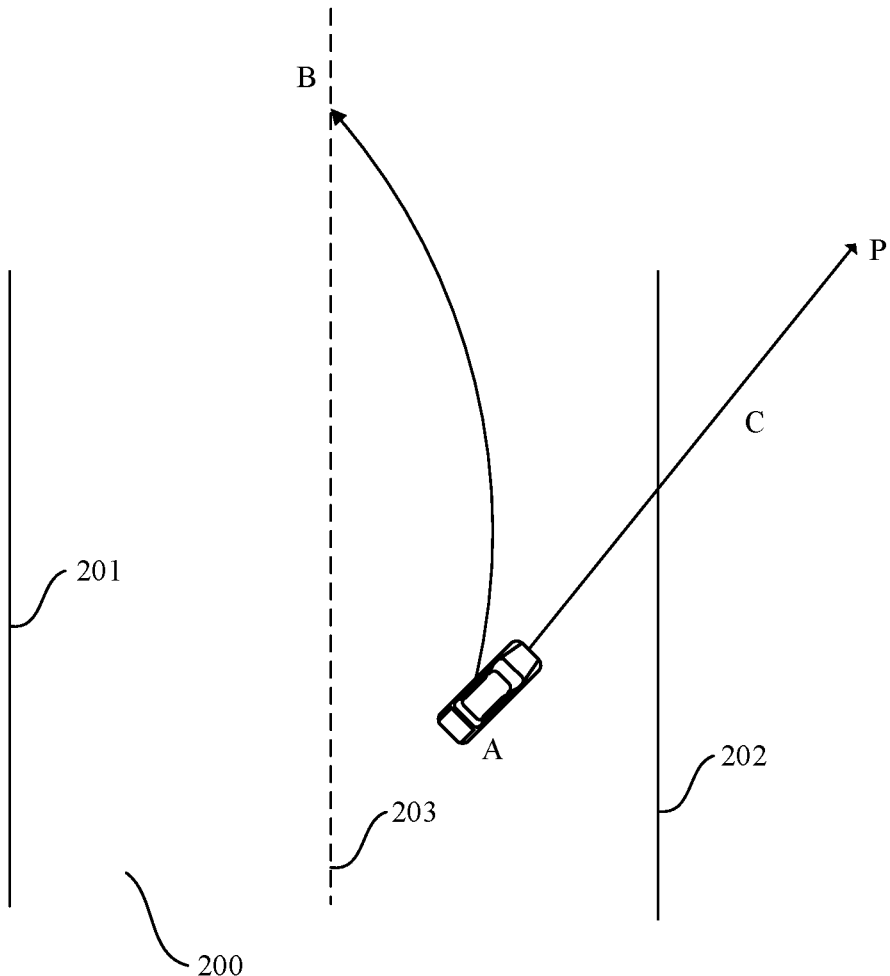
FIG. 2 is a travelling schematic diagram of a vehicle according to one embodiment of the disclosure.

In one example, as shown in FIG. 2, in a lane 200, 201 refers to a left lane line, 202 refers to a right lane line, and a center line 203 is set as a target path. When the vehicle travels to a point A in the lane 200, then the point A is the original position, and the current travelling direction of the vehicle is AP.

This example is a common case where the vehicle deviates from the center line 203 of the lane 200, i.e., the point A deviates from the center line 203 and the travelling direction AP deviates from the center line 203. In order to describe the implementation of the embodiment of the disclosure in detail, an enlarged manner is adopted to mark and make it clear. In practice, a range of the point A deviating from the center line 203 is [−1 m, 1 m], and a range of the travelling direction AP deviating from the center line 203 is [−7°, 7°].

In step 102, the vehicle travelling along the plurality of travelling directions from the original position in the lane is respectively previewed to obtain a plurality of previewing paths.

In the embodiment of the disclosure, each travelling state includes one travelling direction, i.e., the plurality of travelling states include the plurality of travelling directions.

During travelling, a driver usually not only observes a current road condition of the vehicle, but also considers road information within a certain distance in front of the vehicle to obtain certain predictability and adjust the vehicle in advance, thus obtaining a good control effect.

In the controller of the vehicle, a path of the vehicle travelling along the travelling direction from the original position may be predicted, and a travelling distance in a future period of time may be used as a previewing path.

In one example, as shown in FIG. 2, it is assumed that the vehicle travels from the point A along the travelling direction AP for a certain path, wherein the path is a previewing path AC.

In step 103, a plurality of turning paths of the vehicle travelling from the original position to a target path in the lane are fit according to the plurality of previewing paths.

In the controller of the vehicle, deviation may be made based on the previewing paths to fit the turning path of the vehicle from the original position to the target path. At this moment, the turning path is larger.

In one example, as shown in FIG. 2, it is capable to fit the turning path, i.e., an arc AB, of a vehicle traveling from an original position A to the center line 203 of the lane 200 based on the previewing path AC.

When the vehicle is turning, a centripetal force is provided by a ground friction force. According to the law of circular motion, the larger the turning path of the vehicle, the smaller the centripetal force required. If the turning radius is too small, the required centripetal force is large, exceeding the maximum ground friction force, and the vehicle will slip.

Therefore, the larger the turning path, the more stable the vehicle will run. In the case of maintaining a certain travelling speed, travelling along the turning path of a circular arc may ensure the stability of travelling.

In step 104, the plurality of turning paths are used to calculate change information of a steering wheel angle.

In the controller of the vehicle, the steering wheel angle may be calculated by using the turning path based on the principle of a transmission system of the vehicle.

In step 105, the travelling direction is adjusted according to the change information of the steering wheel angle, so as to control the vehicle to travel from the original position to the target path along the turning path.

In the specific implementation, the controller may send a steering angle command to an EPS (Electric Power Steering) based on the steering wheel angle at a certain frequency/time interval (e.g., 50 HZ/20 ms), and the EPS executes a corresponding steering angle operation, that is, at each new moment, a new steering wheel angle is calculated according to the state of the vehicle. Repeatedly, travelling errors are corrected according to the current vehicle condition at all times, so that the vehicle may well keep travelling on the target path in the lane.

Further, the steering wheel angle may be converted into a voltage signal, which is transmitted to an ECU (Electronic Control Unit). After being calculated by the ECU, the ECU sends a control command to a motor and a clutch, i.e., outputs an appropriate current to the motor and the clutch, and drives the motor to generate a torque while the clutch is engaged. The torque is applied to an output shaft after the clutch and a reduction mechanism connected with the motor reduce speed and increase distance, and a lower end of the output shaft is connected with a pinion in a rack-and-pinion steering gear assembly, so that the torque emitted by the motor is finally applied to a steering mechanism of the vehicle through a rack-and-pinion steering gear to obtain an appropriate steering assistance.

By predicating the motion state of the vehicle, previewing the previewing path for future travelling, performing deviation according to the previewing path, fitting the turning path of the vehicle from the original position to the target path, taking a future previewing path as a target to adjust the current steering wheel angle, the embodiment of the disclosure can implement advanced adjustment, so that the vehicle can return to the target path of the lane, and adjustment according to the empirical value is avoided; moreover, the turning path obtained based on deviation of the previewing path is larger, so that a centripetal force during turning is reduced, and the possibility of slipping is reduced, which ensures the stability of travelling while maintaining a certain travelling speed, effectively alleviates the problems of overshoot and shock, and improves the comfort of drivers.

Figure 3:
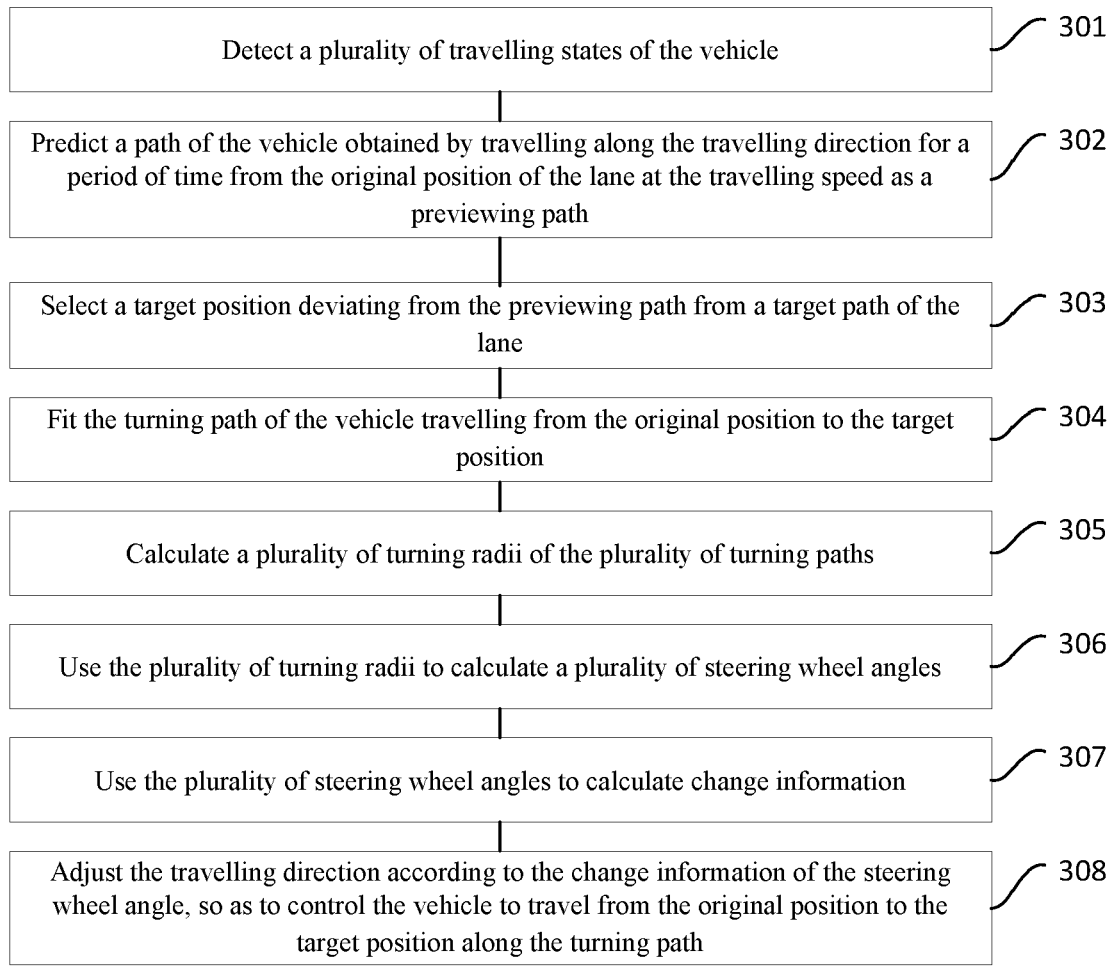
FIG. 3 is a flow chart of steps of another method for controlling vehicle travelling according to one embodiment of the disclosure.

FIG. 3 illustrates a flow chart of steps of another method for controlling vehicle travelling according to one embodiment of the disclosure, wherein a target path is set in a lane and the vehicle travels to an original position in the lane. The method may specifically include the following steps.

In step 301, a plurality of travelling states of the vehicle are detected.

In the embodiment of the disclosure, the travelling state includes a travelling direction, a travelling speed, a first distance and a second distance.

The first distance is a distance between a left wheel of the vehicle and a left lane line of the lane, and the second distance is a distance between a right wheel of the vehicle and a right lane line of the lane.

In step 302, a path of the vehicle obtained by travelling along the travelling direction for a period of time from the original position of the lane at the travelling speed is predicted as a previewing path.

In the embodiment of the disclosure, the path of travelling for a period of time (e.g., 1.2 s to 1.5 s) along the current travelling direction at the current travelling speed may be taken as the previewing path, so the previewing path is a segment in general.

In step 303, a target position deviating from the previewing path is selected from the target path of the lane.

In the specific implementation, it can be considered that the target path is formed by curve fitting of discrete positions, and some target positions may be selected among these discrete positions, which may indicate the deviation of the target path from the previewing path.

In one embodiment, a previewing position may be selected in the previewing paths, and a position satisfying a preset deviation condition may be selected from the target path of the lane as a target position deviating from the previewing path.

The deviation condition is: forming a previewing deviation with a path between the previewing positions, the previewing deviation being perpendicular to the previewing path.

In general, a position that the vehicle finally arrives after travelling along the travelling direction for a period of time at the travelling speed may be selected as the previewing position.

Obviously, in addition to the finally arrived position, other positions in the previewing path may also be selected as the previewing position, and the embodiment of the disclosure is not limited thereto.

In step 304, the turning path of the vehicle travelling from the original position to the target position is fit.

In the controller of the vehicle, the turning path of the vehicle travelling from the original position to the target position may be fitted.

In one implementation, a steering center may be set in a direction perpendicular to the travelling direction, and the turning path of the vehicle travelling from the original position to the target position may be fitted based on the steering center.

In this implementation, in order to make each wheel roll without slipping when the vehicle is steering, each wheel may rotate around a center point, and the center point may become the steering center.

This steering center generally falls on an extension line of a center line of a rear axle, and moreover, left and right front wheels rotate around the steering center.

In the embodiment of the disclosure, the steering center is located in the direction perpendicular to the travelling direction, and the fitted turning path is circular, so that the travelling direction is a tangent of the turning path.

In step 305, a plurality of turning radii of the plurality of turning paths are calculated.

The turning radius of the vehicle may refer to a radius of a locus circle made by the a center of a tread of an outside steering wheel on a flat ground when the vehicle makes a circular motion.

The turning radius is usually related to factors such as an axle base and a wheel base of the vehicle, a limit steering angle of the steering wheel, etc.

In general, the larger the axle base and the wheel base, the larger the turning radius. The larger the limit steering angle of the steering wheel, the smaller the turning radius.

In the embodiment of the disclosure, the first distance, the second distance, the previewing distance and the travelling direction may be adopted to calculate the turning radius of the turning path through a geometric relation.

Figure 4:
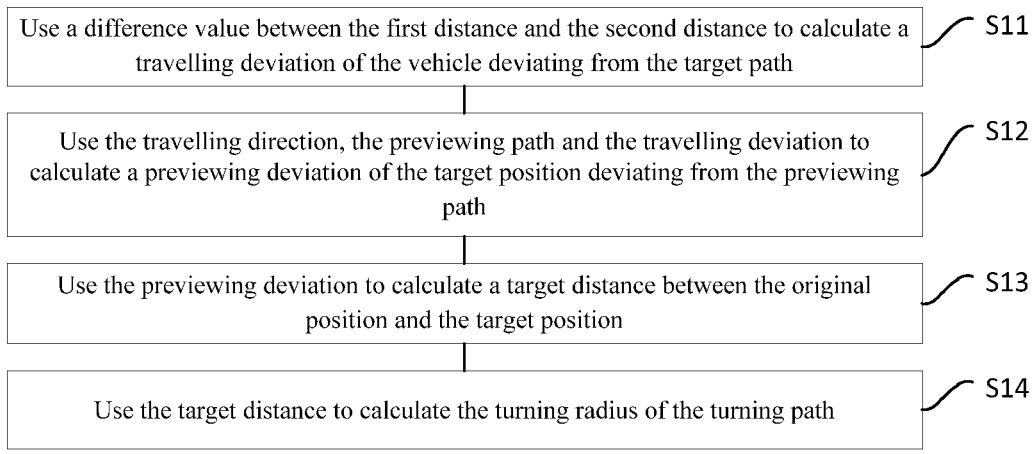
FIG. 4 is a flow chart of a step of calculating a turning radius according to one embodiment of the disclosure.

In one implementation, as shown in FIG. 4, the step 305 may include the following substeps.

In substep S11, a difference value between the first distance and the second distance is used to calculate a travelling deviation of the vehicle deviating from the target path.

In general, the travelling deviation of the vehicle deviating from the target path may refer to a distance between a center point of the vehicle and the target path.

Therefore, a half of the difference value between the first distance and the second distance may be set as the travelling deviation of the vehicle deviating from the target path.

In substep S12, the travelling direction, the previewing path and the travelling deviation are used to calculate a previewing deviation of the target position deviating from the previewing path.

In practical application, the travelling direction and the previewing path are known values, and the distance of the target position deviating from the previewing path may be calculated through a geometric relation with the travelling deviation to obtain the previewing deviation.

In substep S13, the previewing deviation is used to calculate a target distance between the original position and the target position.

In a region composed of the original position, the target position and the previewing position, the target distance between the original position and the target position may be calculated by a geometric relation.

In substep S14, the target distance is used to calculate the turning radius of the turning path.

In a region composed of the original position, the target position and the steering center, the turning radius of the turning path may be calculated by a geometric relation.

In order to enable those skilled in the art to better understand the embodiment of the disclosure, a calculating method of the turning radius in the embodiment of the disclosure will be explained below through specific examples.

Figure 5:
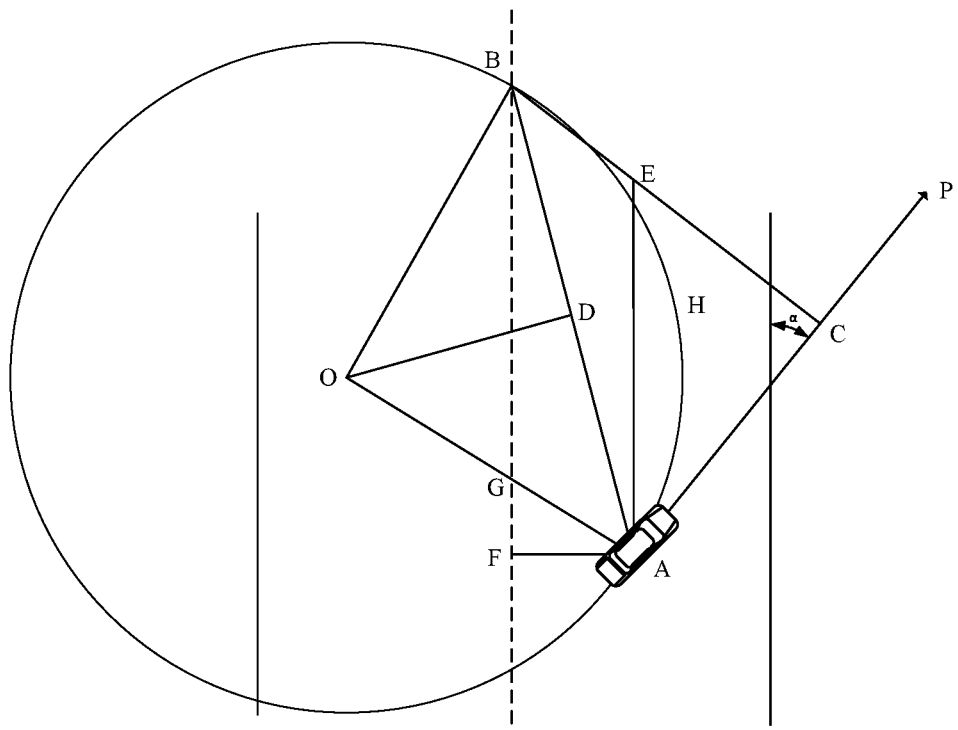
FIG. 5 is a travelling schematic diagram of another vehicle according to one embodiment of the disclosure.

As shown in FIG. 5, A refers to the original position is A. AP refers to the travelling direction, AC refers to the previewing distance, and B refers to the target position, i.e., BC refers to the previewing deviation, BC⊥AC, and AB refers to the target distance.

A perpendicular line AE is set as an auxiliary line passing through the original position A and parallel to the lane line of the lane and/or the center line of the lane, and the perpendicular line AE intersects with the previewing deviation BC at a point E A horizontal line AF is set as an auxiliary line passing through the original position A and perpendicular to the lane line of the lane and/or the center line of the lane, and the horizontal line AF intersects with the center line of the lane at a point F, that is, AF is the travelling deviation, and AF⊥AE.

In the direction perpendicular to the travelling direction AP, a point O is selected as the steering center (i.e., a circle center) to fit the turning path from the original position A to the target position B, i.e., ⊙O.

In ⊙O, OA⊥AC, a radius OA intersects with the center line of the lane at a point G, and auxiliary line OD is added to make OD⊥AB.

In this example, when a direction of the lane line approaches the center line of the vehicle, the anticlockwise approaching to the center line is set to be a positive value, and the clockwise approaching to the center line is set to be a negative value.

An included angle between the travelling direction AP and the lane line is detected to be a, and the previewing distance AC is calculated to be P through a product of the travelling speed and a previewing time.

It is assumed that the first distance is l, the second distance is r, a width of the vehicle is w, AF is y, and the turning radius OA/OB is R, then:

$$y = \frac{l+r+w}{2} - l - \frac{w}{2} = \frac{r-l}{2}$$

Because AE is parallel to the lane line, ∠CAE=α.

In △ACE, ∠ACE is a right angle; therefore, CE=AC*tan ∠CAE=-P*tan α.

BC⊥AC, and OA⊥AC. i.e., OA//BC, and BG//AE; therefore, a quadrangle AEBG is a parallelogram, and BE=AG.

∠FAE and ∠CAG are right angles. i.e., ∠FAG+∠GAE=90°, and ∠CAE+∠GAE=90° therefore, ∠FAG=∠CAE=α.

In △AFG, $AG = \frac{AF}{\cos\angle FAG} =$, i.e., $BE = \frac{y}{\cos\alpha}$ $BC = CE + BE = \frac{y}{\cos\alpha} - P*\tan\alpha.$ In △ABC, $AB = \sqrt{AC^2 + BC^2} = \sqrt{P^2 + \left(\frac{y}{\cos\alpha} - P*\tan\alpha\right)^2}$ $\sin\angle BAC = \frac{BC}{AB} = \frac{\frac{y}{\cos\alpha} - P*\tan\alpha}{\sqrt{P^2 + \left(\frac{y}{\cos\alpha} - P*\tan\alpha\right)^2}}$ ∠ODA and ∠CAG are right angles, i.e., ∠BAC+∠OAD=90°, and ∠AOD+∠OAD=90°; therefore, ∠AOD=∠BAC.

In △AOD:

$$OA = \frac{AD}{\sin\angle AOD} = \frac{\frac{AB}{2}}{\frac{BC}{AB}} = \frac{AB^2}{2*BC} = \frac{P^2 + \left(\frac{y}{\cos\alpha} - P*\tan\alpha\right)^2}{2*\left(\frac{y}{\cos\alpha} - P*\tan\alpha\right)}$$

Therefore:

$$R = \frac{P^2 + \left(\frac{y}{\cos\alpha} - P*\tan\alpha\right)^2}{2*\left(\frac{y}{\cos\alpha} - P*\tan\alpha\right)}$$

In step 306, the plurality of turning radii are used to calculate a plurality of steering wheel angles.

In the specific implementation, a ratio of an axle base to the steering radius may be calculated to obtain a steering angle of a front wheel. A product between the steering angle of the front wheel and a steering gear ratio is calculated to obtain the steering wheel angle.

It is assumed that the steering wheel angle is δ, a wheel base is L, and the steering gear ratio is i, then:

$$\delta = \frac{L*i}{R}$$

In step 307, the plurality of steering wheel angles are used to calculate the change information.

Based on a plurality of consecutive steering wheel angles, the change information of the steering wheel angles may be determined, such as gradually increasing, gradually decreasing, keeping unchanged, etc.

In step 308, the travelling direction is adjusted according to the change information of the steering wheel angle, so as to control the vehicle to travel from the original position to the target position along the turning path.

In the specific implementation, the controller may send a steering angle command to the EPS, and the EPS executes a corresponding steering angle operation, so that the vehicle may travel to the target position and keep travelling on the target path in the lane.

It should be noted that, for the sake of simple description, the method embodiments are all expressed as a series of action combinations, but those skilled in the art should understand that the embodiments of the disclosure are not limited by the described action sequences, because certain steps may be performed in other sequences or concurrently according to the embodiments of the disclosure. Secondly, those skilled in the art should also understand that the embodiments described in the specification are all preferred embodiments, and the actions involved are not necessarily required by the embodiments of the disclosure.

Figure 6:
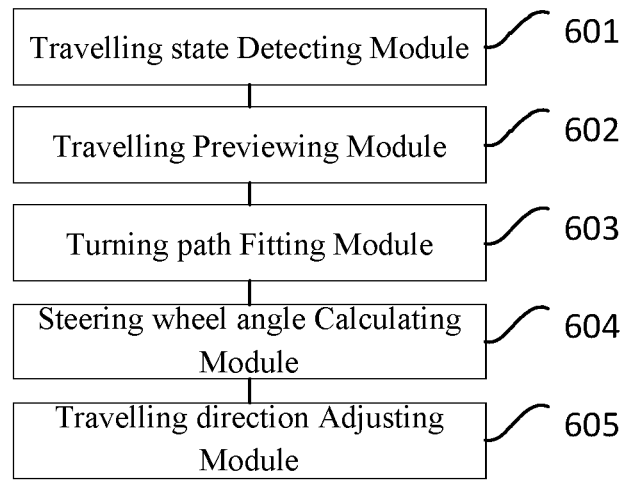
FIG. 6 is a structural block diagram of an apparatus for controlling vehicle travelling according to one embodiment of the disclosure.

FIG. 6 illustrates a structural block diagram of an apparatus for controlling vehicle travelling according to an embodiment of the disclosure, which may specifically include the following modules:

a travelling state detecting module 601 configured to detect a plurality of travelling states of a vehicle, the plurality of travelling states including a plurality of travelling directions;

a travelling previewing module 602 configured to respectively preview the vehicle travelling along the travelling directions from an original position in a lane to obtain a plurality of previewing paths;

a turning path fitting module 603 configured to fit a plurality of turning paths of the vehicle travelling from the original position to a target path in the lane according to the plurality of previewing paths;

a steering wheel angle calculating module 604 configured to use the plurality of turning paths to calculate change information of a steering wheel angle; and a travelling direction adjusting module 605 configured to adjust the travelling direction according to the change information of the steering wheel angle, so as to control the vehicle to travel from the original position to the target path along the turning path.

In one embodiment of the disclosure, the travelling state further includes a travelling speed; and the travelling previewing module 602 includes:

a travelling section predicting module configured to predict a path of the vehicle obtained by travelling along the travelling direction for a period of time from the original position of the lane at the travelling speed as the previewing path.

In one embodiment of the disclosure, the turning path fitting module 603 further includes:

a target position selecting module configured to select a target position deviating from the previewing path from the target path of the lane; and a target position fitting module configured to fit the turning path of the vehicle travelling from the original position to the target position.

In one embodiment of the disclosure, the target position selecting module includes:

a previewing position selecting module configured to select a previewing position in the previewing path; and a deviation position selecting module configured to select a position satisfying a preset deviation condition from the target path of the lane as the target position deviating from the previewing path;

wherein the deviation condition is: forming a previewing deviation with a path between the previewing positions, the previewing deviation being perpendicular to the previewing path.

In one embodiment of the disclosure, the target position fitting module includes:

a steering center setting module configured to set a steering center in a direction perpendicular to the travelling direction; and a steering center fitting module configured to fit the turning path of the vehicle travelling from the original position to the target position on the basis of the steering center.

In one embodiment of the disclosure, the steering wheel angle calculating module 604 includes:

a radius calculating module configured to calculate a plurality of turning radii of the plurality of turning paths;

a steering wheel angle calculating module configured to use the plurality of turning radii to calculate a plurality of steering wheel angles; and a change information calculating module configured to use the plurality of steering wheel angles to calculate the change information.

In one embodiment of the disclosure, the travelling state further includes a first distance and a second distance, the first distance is a distance between a left wheel of the vehicle and a left lane line of the lane, and the second distance is a distance between a right wheel of the vehicle and a right lane line of the lane; and the radius calculating module includes:

a travelling deviation calculating module configured to use a difference value between the first distance and the second distance to calculate a travelling deviation of the vehicle deviating from the target path;

a previewing deviation calculating module configured to use the travelling direction, the previewing path and the travelling deviation to calculate a previewing deviation of the target position deviating from the previewing path;

a target distance calculating module configured to use the previewing deviation to calculate a target distance between the original position and the target position; and a turning radius calculating module configured to use the target distance to calculate the turning radius of the turning path.

By predicating the motion state of the vehicle, previewing the previewing path for future travelling, performing deviation according to the previewing path, fitting the turning path of the vehicle from the original position to the target path, taking a future previewing path as a target to adjust the current steering wheel angle, the embodiment of the disclosure can implement advanced adjustment, so that the vehicle can return to the target path of the lane, and adjustment according to the empirical value is avoided; moreover, the turning path obtained based on deviation of the previewing path is larger, so that a centripetal force during turning is reduced, and the possibility of slipping is reduced, which ensures the stability of travelling while maintaining a certain travelling speed, effectively alleviates the problems of overshoot and shock, and improves the comfort of drivers.

Figure 7:
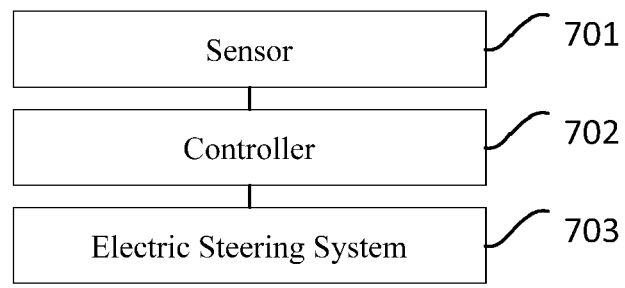
FIG. 7 is a structural block diagram of a vehicle according to one embodiment of the disclosure.

FIG. 7 illustrates a structural block diagram of a vehicle according to an embodiment of the disclosure, which may specifically include:

a sensor 701 configured to detect a plurality of travelling states of a vehicle, the plurality of travelling states including a plurality of travelling directions;

a controller 702 configured to respectively preview the vehicle travelling along the plurality of travelling directions from an original position in a lane to obtain a plurality of previewing paths; fit a plurality of turning paths of the vehicle travelling from the original position in the lane to a target path in the lane according to the plurality of previewing paths; and use the plurality of turning paths to calculate change information of a steering wheel angle; and an electric steering system 703 configured to adjust the travelling direction according to the change information of the steering wheel angle, so as to control the vehicle to travel from the original position to the target position along the turning path.

In one embodiment of the disclosure, the sensor 701 includes at least one of the followings:

a speed sensor configured to detect a travelling speed of the vehicle as a travelling state; and a camera configured to detect a travelling direction of the vehicle, a first distance and a second distance as travelling states.

The first distance is a distance between a left wheel of the vehicle and a left lane line of the lane, and the second distance is a distance between a right wheel of the vehicle and a right lane line of the lane.

In one embodiment of the disclosure, the travelling state further includes a travelling speed; and the controller 702 is also configured to:

predict a path of the vehicle obtained by travelling along the travelling direction for a period of time from the original position of the lane at the travelling speed as the previewing path.

In one embodiment of the disclosure, the controller 702 is also configured to:

select a target position deviating from the previewing path from the target path of the lane; and fit the turning path of the vehicle travelling from the original position to the target position.

In one embodiment of the disclosure, the controller 702 is also configured to:

select a previewing position in the previewing path; and select a position satisfying a preset deviation condition from the target path of the lane as the target position deviating from the previewing path;

wherein the deviation condition is: forming a previewing deviation with a path between the previewing positions, the previewing deviation being perpendicular to the previewing path.

In one embodiment of the disclosure, the controller 702 is also configured to:

set a steering center in a direction perpendicular to the travelling direction; and fit the turning path of the vehicle travelling from the original position to the target position on the basis of the steering center.

In one embodiment of the disclosure, the controller 702 is also configured to:

calculate a plurality of turning radii of the plurality of turning paths;

use the plurality of turning radii to calculate a plurality of steering wheel angles; and use the plurality of steering wheel angles to calculate the change information.

In one embodiment of the disclosure, the travelling state further includes a first distance and a second distance, the first distance is a distance between a left wheel of the vehicle and a left lane line of the lane, and the second distance is a distance between a right wheel of the vehicle and a right lane line of the lane; and the controller 702 is also configured to:

use a difference value between the first distance and the second distance to calculate a travelling deviation of the vehicle deviating from the target path;

use the travelling direction, the previewing path and the travelling deviation to calculate a previewing deviation of the target position deviating from the previewing path;

use the previewing deviation to calculate a target distance between the original position and the target position; and use the target distance to calculate the turning radius of the turning path.

By predicating the motion state of the vehicle, previewing the previewing path for future travelling, performing deviation according to the previewing path, fitting the turning path of the vehicle from the original position to the target path, taking a future previewing path as a target to adjust the current steering wheel angle, the embodiment of the disclosure can implement advanced adjustment, so that the vehicle can return to the target path of the lane, and adjustment according to the empirical value is avoided; moreover, the turning path obtained based on deviation of the previewing path is larger, so that a centripetal force during turning is reduced, and the possibility of slipping is reduced, which ensures the stability of travelling while maintaining a certain travelling speed, effectively alleviates the problems of overshoot and shock, and improves the comfort of drivers.

For the apparatus and vehicle embodiments, the descriptions thereof are relatively simple since the apparatus embodiments are basically similar to the method embodiments, and the relevant points can refer to the partial explanation of the method embodiments.

The various embodiments in this specification are described in a progressive manner, each embodiment focuses on the differences from other embodiments, and the same and similar parts among the various embodiments can be referred to each other.

Those skilled in the art will appreciate that embodiments of the disclosure may be provided as a method, an apparatus, or a computer program product. Therefore, the embodiments of the disclosure may take the form of a complete hardware embodiment, a complete software embodiment, or an embodiment combining software and hardware aspects. Moreover, the embodiments of the disclosure may take the form of a computer program product embodied on one or more computer usable storage media (including but not limited to disk storage, CD-ROM, optical storage, etc.) in which computer usable program codes are included.

The embodiments of the disclosure have been described with reference to the flow charts and/or block diagrams of the method, the terminal device (system), and the computer program products according to the embodiments of the disclosure. It should be appreciated that each flow and/or block in the flow charts and/or block diagrams, and combinations of the flows and/or blocks in the flow charts and/or block diagrams may be implemented by computer program instructions. These computer program instructions may be provided to a general purpose computer, a special purpose computer, an embedded processor, or a processor of other programmable data processing terminal device to produce a machine for the instructions executed by the computer or the processor of other programmable data processing terminal device to generate an apparatus for implementing the functions specified in one or more flows of the flow chart and/or in one or more blocks of the block diagram.

These computer program instructions may also be provided to a computer-readable memory that can guide the computer or other programmable data processing terminal device to work in a given manner, so that the instructions stored in the computer-readable memory generate a product including an instruction apparatus that implements the functions specified in one or more flows of the flow chart and/or in one or more blocks of the block diagram.

These computer program instructions may also be loaded to a computer, or other programmable terminal device, so that a series of operating steps are executed on the computer, or other programmable terminal device to produce processing implemented by the computer, so that the instructions executed in the computer or other programmable terminal device provide steps for implementing the functions specified in one or more flows of the flow chart and/or in one or more blocks of the block diagram.

Figure 8:
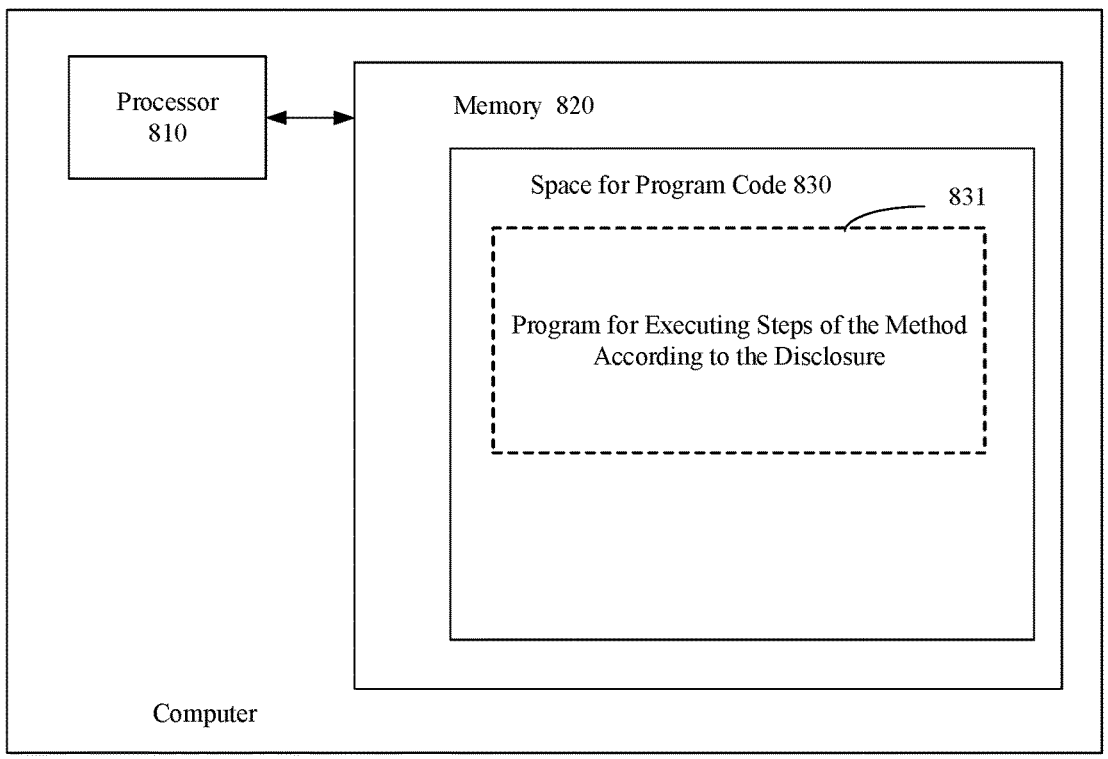
FIG. 8 schematically illustrates a structural block diagram of a computing device for executing the method for controlling vehicle travelling according to the disclosure.
Figure 9:
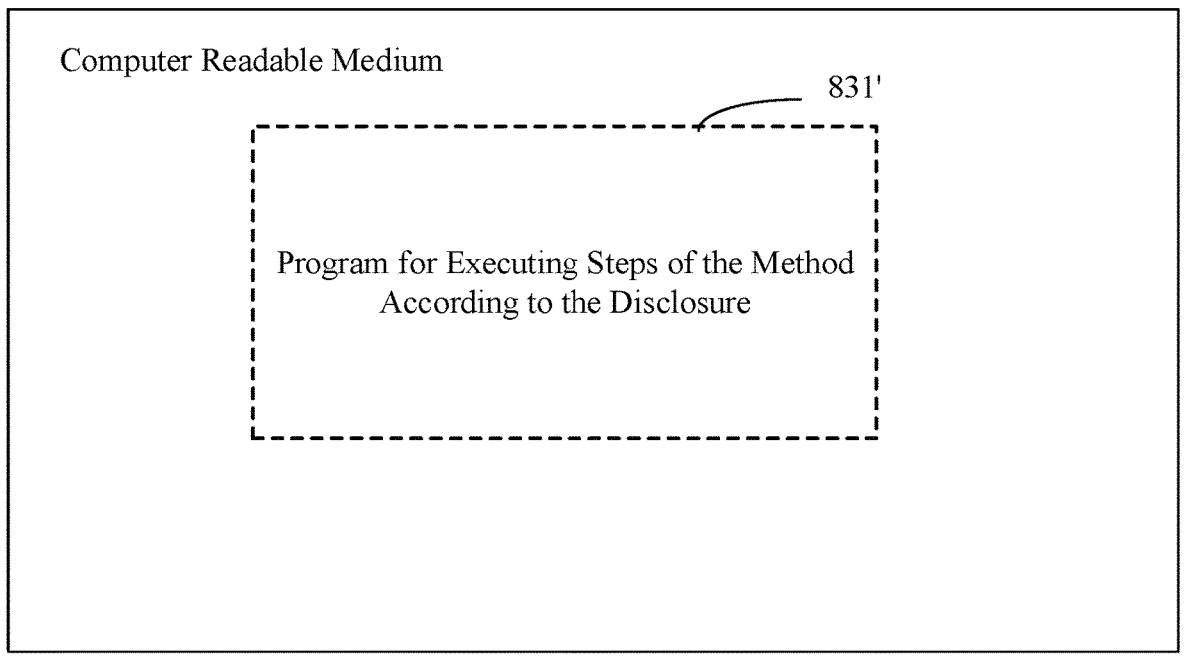
FIG. 9 schematically illustrates a computer readable medium of a computer readable medium for keeping or carrying a program code of controlling vehicle travelling according to the disclosure.

For example, FIG. 8 illustrates a computer capable of implementing the method for controlling vehicle travelling according to the disclosure. The computer may be arranged on the vehicle, and serves as a computing device on the vehicle. The computer conventionally includes a processor 810 and a computer program product or computer readable medium in the form of a memory 820. The memory 820 may be an electronic memory such as a flash memory, an EEPROM (Electrically Erasable Programmable Read Only Memory), an EPROM, a hard disk, or a ROM. The memory 820 has a storage space 830 of a program code 831 for executing any of the method steps described above. For example, the storage space 830 for the program code may include respective program codes 831 for implementing various steps in the above method, respectively. These program codes may be read from or written to one or more computer program products. These computer program products include program code carriers such as hard disks, compact disks (CD), memory cards, or floppy disks. Such a computer program product is typically a portable or fixed computer readable medium as described in FIG. 9. The computer readable medium as a storage unit may have storage segments, storage spaces, and the like arranged similarly to the memory 820 in the computer of FIG. 8. The program code may be compressed in an appropriate form, for example. Generally, a computer readable recording medium includes computer readable code 831', i.e., codes readable by a processor such as 810, for example, which, when being executed by a computer, causes the computer to execute various steps in the method described above.

The computer readable medium includes any mechanism for storing or transmitting information in a computer readable form. For example, the computer-readable recording medium includes a read only memory, a random access memory, a magnetic disk storage medium, a flash storage medium, electrical, optical, acoustical or other forms of propagated signals (e.g., carrier waves, infrared signals, digital signals), etc.

Although the preferred embodiments of the disclosure have been described, those skilled in the art can make additional changes and modifications to these embodiments once they know the basic inventive concepts. Therefore, the appended claims are intended to be interpreted as including the preferred embodiments and all changes and modifications that fall within the scope of the embodiments of the disclosure.

Finally, it should be also noted that relational terms herein such as first and second, etc., are used merely to distinguish one entity or operation from another entity or operation, and do not necessarily require or imply there is any such relationship or order between these entities or operations. Furthermore, the terms "including", "comprising" or any variations thereof are intended to embrace a non-exclusive inclusion, such that a process, method, article, or terminal device including a plurality of elements includes not only those elements but also includes other elements not expressly listed, or also includes elements inherent to such a process, method, item, or terminal device. In the absence of further limitation, an element defined by the phrase "including a . . . " does not exclude the presence of additional identical element in the process, method, article, or terminal device.

The method and the apparatus for controlling vehicle travelling, and the vehicle provided by the invention are described in detail above. Specific examples are applied to explain the principle and implementation of the disclosure herein. The above examples are only used to help understand the method of the disclosure and the core idea thereof. Meanwhile, for those of ordinary skills in the art, there will be changes in the specific implementation and application scope according to the idea of the disclosure. To sum up, the contents of this specification should not be construed as limiting the disclosure.

What is claimed is:

1. A method for controlling vehicle travelling, comprising:
   detecting a plurality of travelling states of a vehicle, wherein the plurality of travelling states comprises a plurality of travelling directions;
   respectively previewing the vehicle travelling along the plurality of travelling directions from an original position in a lane to obtain a plurality of previewing paths;
   fitting a plurality of turning paths of the vehicle travelling from the original position to a target path in the lane according to the plurality of previewing paths;
   using the plurality of turning paths to calculate change information of a plurality of steering wheel angles; and
   adjusting the plurality of travelling directions according to the change information of the steering wheel angle, to control the vehicle to travel from the original position to the target path along the plurality of turning paths;
   wherein the step of using the plurality of turning paths to calculate the change information of the plurality of steering wheel angles comprises:
   calculating a plurality of turning radii of the plurality of turning paths;
   using the plurality of turning radii to calculate the plurality of steering wheel angles; and
   using the plurality of steering wheel angles to calculate the change information;
   wherein the plurality of travelling states further comprises a first distance and a second distance, the first distance is a distance between a left wheel of the vehicle and a left lane line of the lane, and the second distance is a distance between a right wheel of the vehicle and a right lane line of the lane; and
   the step of calculating the plurality of turning radii of the plurality of turning paths comprises:
   using a difference value between the first distance and the second distance to calculate a travelling deviation of the vehicle deviating from the target path;
   using the plurality of travelling directions, the plurality of previewing paths and the travelling deviation to calculate a previewing deviation of a target position deviating from the plurality of previewing paths;
   using the previewing deviation to calculate a target distance between the original position and the target position; and
   using the target distance to calculate the plurality of turning radius of the plurality of turning paths.

2. The method according to claim 1, wherein the plurality of travelling states further comprises a plurality of travelling speeds; and
   the step of respectively previewing the vehicle travelling along the plurality of travelling directions from the original position in the lane to obtain the plurality of previewing paths comprises:
   predicting paths of the vehicle obtained by travelling along the plurality of travelling directions for a period of time from the original position of the lane at the plurality of travelling speeds as the plurality of previewing paths.

3. The method according to claim 1, wherein the step of fitting the plurality of turning paths of the vehicle travelling from the original position to the target path in the lane according to the plurality of previewing paths comprises:
   selecting target positions deviating from the plurality of previewing paths from the target path of the lane; and
   fitting the plurality of turning paths of the vehicle travelling from the original position to the target path.

4. The method according to claim 3, wherein the step of selecting the target positions deviating from the plurality of previewing paths from the target path of the lane comprises:
   selecting previewing positions in the plurality of previewing paths; and
   selecting positions satisfying a preset deviation condition from the target path of the lane as the target positions deviating from the plurality of previewing paths;
   wherein the preset deviation condition is: forming a previewing deviation with a path between the previewing positions, the previewing deviation is perpendicular to the plurality of previewing paths.

5. The method according to claim 3, wherein the step of fitting the plurality of turning paths of the vehicle travelling from the original position to the target path comprises:
   setting steering centers in a direction perpendicular to the plurality of travelling directions; and
   fitting the plurality of turning paths of the vehicle travelling from the original position to the target path on a basis of the steering centers.

6. An apparatus for controlling vehicle travelling, comprising:
   a processor; and
   a memory storing computer readable programs, wherein when the computer readable programs are executed by the processor, the apparatus are made to perform the operations comprising:
   detecting a plurality of travelling states of a vehicle, wherein the plurality of travelling states comprises a plurality of travelling directions;
   respectively previewing the vehicle travelling along the plurality of travelling directions from an original position in a lane to obtain a plurality of previewing paths;
   fitting a plurality of turning paths of the vehicle travelling from the original position to a target path in the lane according to the plurality of previewing paths;
   using the plurality of turning paths to calculate change information of a plurality of steering wheel angles; and
   adjusting the plurality of travelling directions according to the change information of the plurality of steering wheel angles, so as to control the vehicle to travel from the original position to the target path along the plurality of turning paths;

wherein the operation of using the plurality of turning paths to calculate the change information of the plurality of steering wheel angles comprises:

calculating a plurality of turning radii of the plurality of turning paths;

using the plurality of turning radii to calculate the plurality of steering wheel angles; and using the plurality of steering wheel angles to calculate the change information;

wherein the plurality of travelling states further comprises a first distance and a second distance, the first distance is a distance between a left wheel of the vehicle and a left lane line of the lane, and the second distance is a distance between a right wheel of the vehicle and a right lane line of the lane; and the step of calculating the plurality of turning radii of the plurality of turning paths comprises:

using a difference value between the first distance and the second distance to calculate a travelling deviation of the vehicle deviating from the target path;

using the plurality of travelling directions, the plurality of previewing paths and the travelling deviation to calculate a previewing deviation of the target position deviating from the plurality of previewing paths;

using the previewing deviation to calculate a target distance between the original position and the target position; and using the target distance to calculate the plurality of turning radius of the plurality of turning paths.

7. The apparatus according to claim 6, wherein the operation of fitting the plurality of turning paths of the vehicle travelling from the original position to the target path in the lane according to the plurality of previewing paths comprises:

selecting target positions deviating from the plurality of previewing paths from the target path of the lane; and fitting the plurality of turning paths of the vehicle travelling from the original position to the target positions.

8. The apparatus according to claim 7, wherein the operation of selecting the target position deviating from the plurality of previewing paths from the target path of the lane comprises:

selecting previewing position in the plurality of previewing paths; and selecting position satisfying a preset deviation condition from the target path of the lane as the target position deviating from the plurality of previewing paths;

wherein the preset deviation condition is: forming a previewing deviation with a path between the previewing positions, the previewing deviation is perpendicular to the plurality of previewing paths.

9. The apparatus according to claim 7, wherein the operation of fitting the turning paths of the vehicle travelling from the original position to the target path comprises:

setting steering centers in a direction perpendicular to the plurality of travelling directions; and fitting the plurality of turning paths of the vehicle travelling from the original position to the target path on a basis of the steering centers.

10. The apparatus according to claim 6, wherein the plurality of travelling states further comprises a plurality of travelling speeds; and the operation of respectively previewing the vehicle travelling along the plurality of travelling directions from the original position in the lane to obtain the plurality of previewing paths comprises:

predicting a path of the vehicle obtained by travelling along the plurality of travelling directions for a period of time from the original position of the lane at the plurality of travelling speeds as the plurality of previewing paths.

11. A vehicle, comprising:

a sensor configured to detect a plurality of travelling states of a vehicle, wherein the plurality of travelling states comprises a plurality of travelling directions;

a controller configured to respectively preview the vehicle travelling along the plurality of travelling directions from an original position in a lane to obtain a plurality of previewing paths;

fit a plurality of turning paths of the vehicle travelling from the original position in the lane to a target path in the lane according to the plurality of previewing paths; and use the plurality of turning paths to calculate change information of a plurality of steering wheel angles; and an electric steering system configured to adjust the plurality of travelling directions according to the change information of the plurality of steering wheel angles, to control the vehicle to travel from the original position to a target position along the plurality of turning paths;

wherein the operation of using the plurality of turning paths to calculate the change information of the plurality of steering wheel angles comprises:

calculating a plurality of turning radii of the plurality of turning paths;

using the plurality of turning radii to calculate the plurality of steering wheel angles; and using the plurality of steering wheel angles to calculate the change information;

wherein the plurality of travelling states further comprises a first distance and a second distance, the first distance is a distance between a left wheel of the vehicle and a left lane line of the lane, and the second distance is a distance between a right wheel of the vehicle and a right lane line of the lane; and the step of calculating the plurality of turning radii of the plurality of turning paths comprises:

using a difference value between the first distance and the second distance to calculate a travelling deviation of the vehicle deviating from the target path;

using the plurality of travelling directions, the plurality of previewing paths and the travelling deviation to calculate a previewing deviation of the target position deviating from the plurality of previewing paths;

using the previewing deviation to calculate a target distance between the original position and the target position; and using the target distance to calculate the plurality of turning radius of the plurality of turning paths.

12. The vehicle according to claim 11, wherein the plurality of travelling states further comprise a plurality of travelling speeds; and the operation of respectively previewing the vehicle travelling along the plurality of travelling directions from the original position in the lane to obtain the plurality of previewing paths comprises:

predicting paths of the vehicle obtained by travelling along the plurality of travelling directions for a period of time from the original position of the lane at the plurality of travelling speeds as the previewing paths.

13. The vehicle according to claim 11, wherein the operation of fitting the plurality of turning paths of the vehicle travelling from the original position to the target path in the lane according to the plurality of previewing paths comprises:
selecting target position deviating from the plurality of previewing paths from the target path of the lane; and
fitting the plurality of turning paths of the vehicle travelling from the original position to the target path.

14. The vehicle according to claim 13, wherein the operation of selecting the target position deviating from the plurality of previewing paths from the target path of the lane comprises:
selecting previewing position in the plurality of previewing paths; and
selecting position satisfying a preset deviation condition from the target path of the lane as the target position deviating from the plurality of previewing paths;
wherein the preset deviation condition is: forming a previewing deviation with a path between the previewing positions, the previewing deviation is perpendicular to the plurality of previewing paths.

15. The vehicle according to claim 13, wherein the operation of fitting the plurality of turning paths of the vehicle travelling from the original position to the target path comprises:
setting steering center in a direction perpendicular to the plurality of travelling directions; and
fitting the plurality of turning paths of the vehicle travelling from the original position to the target path on a basis of the steering centers.

\* \* \* \* \*